Patented Aug. 17, 1937

2,090,098

UNITED STATES PATENT OFFICE 2,090,098

GLASS RESISTING METAL VAPORS

Edwin Berger and Wolfgang Harries, Jena, Germany, assignors to the firm of Jenaer Glaswerk Schott & Gen., Jena, Germany No Drawing. Application April 7, 1933, Serial No. 664,936. In Germany April 12, 1932

6 Claims. (Cl. 106—36.1)

We have filed an application in Germany, April 12, 1932.

It is a known fact that the usual silicate glasses are strongly blackened or colored when exposed to hot metal vapors, especially sodium vapor. To avoid this inconvenience, glasses have been suggested that consist substantially of boric acid or of alumina and boric acid, that is to say of trivalent oxides, and also contain the usual ingredients, such as monovalent and bivalent oxides (alkalis and alkaline earths, respectively), the mixture of trivalent and monovalent oxides amounting to more than 75%, approximately, and that of bivalent oxides, to at most 25%. Glasses of this kind have a low melting point if the content of alumina does not surpass 50% and, consequently, they may not be strong enough to resist the pressure of metal vapors in practically possible higher temperatures. Owing to the narrow range of temperature within which they have a suitable viscosity for being worked, and on account of their brittleness, these glasses may be shaped to tubes, containers and the like only with difficulty, it being almost impossible to fuse them to electrodes of the usual material. Finally, the glasses may easily lose their transparency when exposed to steam and watery solutions. For all these reasons the suggestion has been made to use the said glasses for coating the usual glass (compound glasses). Also it has been tried to avoid part of these inconveniences, especially the difficulty of working the glass and an eventual softening, by adding to the glass composition not only boric acid and alumina but also a considerable quantity of silica. However, in glasses composed in this manner, the capacity of resisting the attacks of metal vapors is reduced, these glasses being colored more or less, especially in the high temperatures required for obtaining the best possible economy in alkali metal lamps.

The present invention aims at providing glasses that are highly resistant to attacks of metal vapors, easily fusible to the usual electrode material, and readily workable, and which have a high softening point and offer resistance to atmospheric influences. These favorable properties are obtained when the content of alkalis and silica is small or equal to zero and that of bivalent oxides, as great as possible. To attain the said advantages, the new glasses are to be so composed that, in addition to boric acid and at most 45% of alumina, there are at least 25% and at most 80% of bivalent oxides, at any rate so much of the bivalent oxides that the sum of one-and-a-half times the percentage of bivalent oxides, of the second group and the percentage of alumina is at least 45. In order not to impair the properties aimed at, silica and other tetravalent oxides, such as titanium, zirconium, thorium and alkali oxides, may be present only to a certain extent. Also any higher content of antimony oxide, arsenic oxide or lead oxide is to be avoided, because these ingredients may easily entail a blackening when the glass is being worked. The new glasses may therefore contain at most 5% of tetravalent oxides, alkali oxides, antimony oxide, arsenic oxide, and lead oxide, together.

Of the bivalent oxides, barium oxide is specially suitable. Oxides of beryllium, magnesium, calcium, strontium or zinc may be substituted for barium oxide, the content of zinc oxide being restricted, however, to 5% at most. Mixtures of these oxides may be used as well. In the new glasses it is possible to alter the coefficient of expansion and the range of temperature of the suitable working viscosity and other properties within wide limits according to requirements and to reduce the tendency to crystallize which is the more noticeable in barium-alumo-borate glasses the smaller the content of barium oxide. It may be laid down as a rule that the content of bivalent oxides may be the smaller the smaller the molecular weight of the oxide in question. For this reason the glass is conveniently given such a content of bivalent oxides, of the second group that the sum of the quotient of the percentage of the different bivalent oxides, of the second group and the molecular weight of these oxides is at least 0.25.

To facilitate avoiding any devitrification, it is convenient to make the content of boric acid not surpass 55%.

Within the stated limits, glasses that are specially easy to work are those which contain 10 to 40% of boric acid, 10 to 35% of alumina, and bivalent oxides, it being advisable to make the content of barium oxide amount to at least 40%.

The following table contains a number of examples of the invention. In each example, Σ at the foot of the table represents the sum of the quotient of the percentage of the different bivalent oxides, of the second group and the molecular weight of these oxides. For the glass VI, for instance, this sum is calculated as follows:

$$\Sigma = \underset{Mg\ \ O}{15/(24.32+16.00)} + \underset{Ba\ \ O}{10/(137.37+16.00)} + \underset{Zn\ \ O}{5/(65.37+16.00)}$$

$$= 0.372 + 0.065 + 0.061$$

$$\Sigma = 0.498$$

|  | I | II | III | IV | V | VI | VII | VIII |
|---|---|---|---|---|---|---|---|---|
| $B_2O_3$ | 20 | 20 | 35.5 | 50 | 45 | 25 | 10 | 60 |
| $Al_2O_3$ | 15 | 30 | 27 | 10 | 25 | 40 | 40 | 10 |
| MgO | | | 10 | | 15 | | | 4 |
| CaO | | | | 10 | | 35 | 50 | |
| BaO | 65 | 45 | 27 | 30 | 10 | | | 26 |
| ZnO | | | | | 5 | | | |
| $SiO_2$ | | 3 | | | | | | |
| $Na_2O$ | | 2 | | | | | | |
| $As_2O_3$ | | | 0.5 | | | | | |
| | 100 | 100 | 100 | 100 | 100 | 100 | 100 | 100 |
| Σ | 0.424 | 0.293 | 0.424 | 0.373 | 0.498 | 0.625 | 0.892 | 0.269 |

We claim:

1. A glass resisting metal vapors, containing 10% to 40% boric oxide, 10% to 35% alumina, not more than 5% taken together of tetravalent oxides, antimony oxide, arsenic oxide, lead oxide, and alkali oxides, and between 25% and 80% bivalent oxides, zinc oxide being not more than 5%, the amount of bivalent oxides present being such that the sum of one-and-a-half times the percentage of bivalent oxides plus the percentage of alumina equals at least 45.

2. A glass according to claim 1, this glass being practically free from tetravalent oxides and alkali oxides.

3. A glass according to claim 1, the sum of the quotient of the percentage of the bivalent oxides present and the molecular weight of these oxides being at least 0.25.

4. A glass consisting of 10% to 40% boric acid, 10% to 35% alumina, and of bivalent oxides, among these bivalent oxides being baryta, the content of baryta amounting to at least 40% of the glass.

5. A glass resisting metal vapors, containing 10% to 40% boric acid, 10% to 35% alumina and at least 25% oxides selected from the group consisting of BeO, MgO, CaO, SrO, and BaO, ZnO, and other oxides, if any, being present up to at most 5%.

6. A glass according to claim 5, the content of baryta amounting to at least 40%.

EDWIN BERGER.
WOLFGANG HARRIES.